(12) United States Patent
Zhang et al.

(10) Patent No.: US 11,189,833 B2
(45) Date of Patent: *Nov. 30, 2021

(54) ELECTRODE PLATE, ELECTROCHEMICAL DEVICE AND SAFETY COATING

(71) Applicant: Contemporary Amperex Technology Co., Limited, Ningde (CN)

(72) Inventors: Xiaowen Zhang, Ningde (CN); Haizu Jin, Ningde (CN); Zhenhua Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 147 days.

This patent is subject to a terminal disclaimer.

(21) Appl. No.: 16/165,818

(22) Filed: Oct. 19, 2018

(65) Prior Publication Data

US 2019/0140280 A1 May 9, 2019

(30) Foreign Application Priority Data

Nov. 8, 2017 (CN) .......................... 201711092989.3

(51) Int. Cl.
*H01M 4/62* (2006.01)
*H01M 4/1315* (2010.01)
*H01G 11/28* (2013.01)
(Continued)

(52) U.S. Cl.
CPC .............. *H01M 4/62* (2013.01); *H01G 11/18* (2013.01); *H01G 11/28* (2013.01); *H01G 11/70* (2013.01);
(Continued)

(58) Field of Classification Search
None
See application file for complete search history.

(56) References Cited

U.S. PATENT DOCUMENTS

| 2013/0017439 A1* | 1/2013 | Takahashi | ......... H01M 10/0525 |
| | | | 429/188 |
| 2013/0089781 A1* | 4/2013 | Miyazaki | .............. H01M 4/667 |
| | | | 429/211 |

(Continued)

FOREIGN PATENT DOCUMENTS

| CN | 101471435 | * | 7/2009 | .............. H01M 4/02 |
| CN | 102176360 A | | 9/2011 | |

(Continued)

OTHER PUBLICATIONS

The extended European Search Report for European Application No. 18198249.7, dated Apr. 16, 2019, 10 pages.

(Continued)

*Primary Examiner* — Jeremiah R Smith
(74) *Attorney, Agent, or Firm* — Law Offices of Liaoteng Wang

(57) ABSTRACT

The present invention relates to an electrode plate, an electrochemical device and a safety coating. The electrode plate comprises a current collector, an electrode active material layer and a safety coating disposed between the current collector and the electrode active material layer, the safety coating layer comprising a fluorinated polyolefin and/or chlorinated polyolefin polymer matrix, a conductive material and an inorganic filler. The electrode plate can quickly open the circuit when the electrochemical device (for example, a capacitor, a primary battery, or a secondary battery) is in a high temperature condition or an internal short circuit occurs, and thus it may improve the high temperature safety performance of the electrochemical device.

11 Claims, 1 Drawing Sheet

(51) Int. Cl.
  *H01M 4/13* (2010.01)
  *H01M 10/42* (2006.01)
  *H01G 11/70* (2013.01)
  *H01M 4/66* (2006.01)
  *H01G 11/18* (2013.01)
  *H01G 11/84* (2013.01)
  *H01M 50/581* (2021.01)
  *H01M 4/36* (2006.01)
  *H01M 10/0525* (2010.01)
  *H01M 4/02* (2006.01)

(52) U.S. Cl.
  CPC .............. *H01G 11/84* (2013.01); *H01M 4/13* (2013.01); *H01M 4/1315* (2013.01); *H01M 4/362* (2013.01); *H01M 4/366* (2013.01); *H01M 4/667* (2013.01); *H01M 10/4235* (2013.01); *H01M 50/581* (2021.01); *H01M 10/0525* (2013.01); *H01M 2004/028* (2013.01); *H01M 2200/106* (2013.01)

(56) References Cited

U.S. PATENT DOCUMENTS

| | | |
|---|---|---|
| 2015/0162139 A1 | 6/2015 | Lin et al. |
| 2016/0093922 A1 | 3/2016 | Endo et al. |
| 2017/0214043 A1* | 7/2017 | Liu ........................ H01M 4/139 |
| 2018/0026258 A1* | 1/2018 | Yan ..................... H01M 4/1391 |
| | | 429/231.8 |

FOREIGN PATENT DOCUMENTS

| | | |
|---|---|---|
| CN | 102344598 A | 2/2012 |
| CN | 203218375 A | 9/2013 |
| CN | 103904294 A | 7/2014 |
| CN | 104823313 A | 8/2015 |
| CN | 105594019 A | 5/2016 |
| CN | 106558676 A | 4/2017 |
| CN | 107039640 A | 8/2017 |
| EP | 1126536 A2 | 8/2001 |
| EP | 3187553 A1 | 7/2017 |

OTHER PUBLICATIONS

The Second Office Action for Chinese Application No. 201711092989.3, dated Jul. 22, 2020, 7 pages.
Jiangong Chen:"Study on the PTC safe electrode of lithium-ion batteries" Chinese Master's Theses Full-text Database Engineering Science and Technology II, No. 6 of 2014, Jun. 15, 2014, 12 pages.
The First Office Action for Chinese Application No. 201711092989.3, dated Apr. 26, 2020, 9 pages.

* cited by examiner

ELECTRODE PLATE, ELECTROCHEMICAL DEVICE AND SAFETY COATING

CROSS-REFERENCE TO RELATED APPLICATION

This application is based on and claims priority to Chinese Patent Application No. 201711092989.3 filed on Nov. 8, 2017, which is incorporated herein by reference in its entirety.

TECHNICAL FIELD

The present invention relates to the field of electrochemical technology, and more particularly, to an electrode plate and an electrochemical device containing the electrode plate.

BACKGROUND

Lithium-ion batteries are widely used in electric vehicles and consumer electronics because of their high energy density, high output power, long cycle life and small environmental pollution. However, lithium-ion batteries are prone to fire and explosion when subjected to abnormal conditions such as crushing, bumping or puncture, causing serious harm. Therefore, the safety problem of lithium-ion batteries greatly limits the application and popularity of lithium-ion batteries.

A large number of experimental results show that internal short circuit of lithium-ion battery is the basic cause of the battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even making the conductive path of the entire electrode active material layer to be destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer and also deteriorates its electrical properties. In addition, in the compacting step of the plate fabrication process, the PTC material layer is easily squeezed to the edge and thus the electrode active material layer would directly contact the current collector, so that the PTC material layer cannot improve the safety performance. In addition, it is required to greatly improve the performance of the PTC material layer, such as the response speed, the effect of blocking current, and the like.

In view of this, it is indeed necessary to provide an electrode plate and a battery having improved safety and battery performance (e.g., cycle performance), which are capable of solving the above problems.

SUMMARY

It is an object of the present invention to provide an electrode plate and an electrochemical device having improved safety or electrical performances such as cycle performance.

It is another object of the present invention to provide an electrode plate and an electrochemical device which have both good safety and electrical performances such as cycle performance.

It is a further object of the present invention to provide an electrode plate and an electrochemical device suitable for mass production and application with excellent performances such as good safety performance, improved electrical performance (e.g., cycle performance), and ease of processing.

The present invention provides an electrode plate comprising a current collector, an electrode active material layer and a safety coating disposed between the current collector and the electrode active material layer, the safety coating comprising a polymer matrix, a conductive material and an inorganic filler in which the polymer matrix is a fluorinated polyolefin and/or chlorinated polyolefin polymer matrix, wherein based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %.

The present invention also provides an electrochemical device comprising the electrode plate of the present invention, which is preferably a capacitor, a primary battery or a secondary battery.

The present invention also provides a safety coating useful for an electrode plate, comprising: a polymer matrix, a conductive material and an inorganic filler, wherein the polymer matrix is a fluorinated polyolefin and/or chlorinated polyolefin polymer matrix, and wherein based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %.

DESCRIPTION OF DRAWING

The electrode plate, the electrochemical device and the beneficial effects of the present invention will be described in detail below with reference to the accompanying drawings and specific embodiments.

FIG. 1 is a schematic structural view of a positive electrode plate according to an embodiment of the present invention, in which 10—a current collector; 14—a positive active material layer; 12—a safety coating (i.e., PTC safety coating).

DETAILED DESCRIPTION

The present invention discloses an electrode plate comprising a current collector, an electrode active material layer and a safety coating disposed between the current collector and the electrode active material layer, the safety coating comprising a fluorinated polyolefin and/or chlorinated polyolefin polymer matrix, a conductive material, and an inorganic filler.

The electrode plate may be a positive electrode plate or a negative electrode plate, with the positive electrode plate being preferred because the positive electrode plate would have more prominent safety problem when the battery is used. Obviously, as a positive electrode plate, the electrode active material layer in the electrode plate of the present invention is a positive active material layer; and as a negative electrode plate, the electrode active material layer in the electrode plate of the present invention is a negative active material layer. FIG. 1 shows a schematic structural view of a positive electrode plate according to some embodiments of the present invention, in which 10—a current collector, 14—a positive active material layer, 12—a safety coating (i.e., PTC safety coating).

It is easy to understand that FIG. 1 only shows the embodiment in which the PTC safety coating 12 and the positive active material layer 14 are provided on one side of the positive electrode current collector 10, and the PTC safety coating 12 and the positive active material layer 14 may be disposed on both side of the positive current collector 10 in other embodiments.

In the present invention, fluorinated polyolefin and/or chlorinated polyolefin as the polymer matrix of safety coating refers to polyvinylidene fluoride (PVDF), polyvinylidene chloride (PVDC), modified PVDF, or modified PVDC. For example, the fluorinated polyolefin and/or chlorinated polyolefin may be selected from the group consisting of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In the conventional coating having PTC effect for use in batteries, polyethylene, polypropylene or ethylene propylene copolymer or the like is generally used as the PTC matrix material, in which case it is necessary to additionally add a binder to the PTC matrix material and the conductive material. In the case of adding a binder, if the binder content is too small, the adhesion between the coating and the current collector is poor, and if the binder content is too large, the response temperature and response speed of the PTC effect are affected. Fluorinated polyolefin and/or chlorinated polyolefin (such as PVDF) is a common binder. When used as a binder, the amount of PVDF is much less than the amount of the matrix material. For example, the PVDF binder in conventional PTC coatings is typically present in an amount of less than 15% or 10%, or even less, relative to the total weight of the coating. Some patent applications such as CN105594019A and CN106558676A also mention that PVDF itself may be used as a PTC matrix material, but most of them are theoretical guesses, and the effect of PVDF as a PTC matrix material has not been actually verified. Meanwhile, other documents such as the description on paragraph of CN104823313A clearly state that PVDF is not suitable for use as a PTC matrix material.

In the present invention, the safety coating disposed between the current collector and the electrode active material layer can function as a PTC thermistor layer by using fluorinated polyolefin and/or chlorinated polyolefin as a polymer matrix material. The weight percentage of the fluorinated polyolefin and/or chlorinated polyolefin as the polymer matrix material is from 35 wt % to 75 wt %, relative to the total weight of the safety coating. The amount is much higher than the amount of fluorinated polyolefin and/or chlorinated polyolefin (e.g., PVDF) typically used as a binder in the prior PTC thermistor layers.

In the present invention, the fluorinated polyolefin and/or chlorinated polyolefin material actually functions, both as a PTC matrix and as a binder, which avoids the influence on the adhesion of the coating, the response speed, and the response temperature of the PTC effect due to the difference between the binder and the PTC matrix material.

Secondly, the safety coating composed of a fluorinated polyolefin and/or chlorinated polyolefin material and a conductive material can function as a PTC thermistor layer and its operating temperature range is suitably from 80° C. to 160° C. Thus the high temperature safety performance of the battery may be improved well.

In addition, the fluorinated polyolefin and/or chlorinated polyolefin as a polymer matrix material of the safety coating serves as both a PTC matrix and a binder, thereby facilitating the preparation of a thinner safety coating without affecting the adhesion of the safety coating.

In addition, the solvent (such as NMP or the like) or the electrolyte in the electrode active material layer on the upper layer of the safety coating may have an adverse effect such as dissolution, swelling and the like on the polymer material of the safety coating. For the safety coating containing PVDF in a binder amount, the adhesion would be easy to be worse due to above effect. For the safety coating of the present application, the above adverse effect is negligible since the content of fluorinated polyolefin and/or chlorinated polyolefin is large.

In the electrode plate of the present invention, the weight percentage of the fluorinated polyolefin and/or chlorinated polyolefin polymer matrix is from 35 wt % to 75 wt %, based on the total weight of the safety coating. If the content is too small, the polymer matrix cannot ensure the safety coating works well in terms of its PTC effect; and if the content is too high, the content of the conductive material and the inorganic filler is too small, which also affects the response speed of the safety coating. The weight percentage of the fluorinated polyolefin and/or chlorinated polyolefin polymer matrix is preferably from 40 wt % to 75 wt %, more preferably from 50 wt % to 75 wt %.

In the present invention, the safety coating disposed between the current collector and the electrode active material layer further comprises a conductive material. The conductive material may be selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers; the conductive metal material is selected from at least one of Al powder, Ni powder, and gold powder; and the conductive polymer material is selected from at least one of conductive polythiophene, conductive polypyrrole, and conductive polyaniline. The conductive materials may be used alone or in combination of two or more.

The safety coating of the present invention works as below. At a normal temperature, the safety coating relies on a good conductive network formed between the conductive materials to conduct electron conduction. When the temperature rises, the volume of the polymer matrix material begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero, thereby protecting the electrochemical device that uses the safety coating. Therefore, the amount of conductive material plays a key role in the effect of the PTC layer. In the present invention, the conductive material is present in a weight percentage of 5 wt % to 25 wt %, preferably 5 wt % to 15 wt %, based on the total weight of the safety coating.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

In the present invention, the safety coating disposed between the current collector and the electrode active material layer further comprises an inorganic filler. It has been found that when the safety coating is free of an inorganic filler, the solvent (such as NMP or the like) or the electrolyte of the electrode active material layer disposed on the safety coating may have an adverse effect such as dissolution, swelling, and the like on the polymer material of the safety coating, so that the safety coating will be destroyed, and thus the PTC effect is affected. The inventors have found that after the inorganic filler is added to the safety coating, the inorganic filler acts as a barrier substance, which facilitates the elimination of the above-mentioned adverse effects such as dissolution and swelling, and is advantageous for stabilizing the safety coating. In addition, it has also been found that the addition of the inorganic filler is also advantageous for ensuring that the safety coating is not easily deformed during the plate compaction process. Therefore, the addition of the inorganic filler can guarantee that the safety coating is stably disposed between the current collector and the electrode active material layer, and prevent the current collector from directly contacting the electrode active material layer, thereby improving the safety performance of the battery.

The inventors have also unexpectedly discovered that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example, the operating temperature, the resistance of the safety coating is not as large as expected, and still there is very little current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce the PTC effect in the operating temperature range. That is to say, the increasing speed of the resistance is faster and the PTC response speed is faster at a high temperature. Thus, the safety performance of the battery can be improved better.

The inorganic filler is present in a weight percentage of 10 wt % to 60 wt % based on the total weight of the safety coating. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

The inorganic filler can function as stabilizing the safety coating from the following two aspects: (1) hindering the electrolyte and the solvent (such as NMP, etc.) of the electrode active material layer from dissolving or swelling the polymer material of the safety coating; and (2) guaranteeing that the safety coating is not easily deformed during the plate compaction process.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, or at least one of a conductive carbon coating modified above material, a conductive metal coating modified above material or a conductive polymer coating modified above material.

In addition, it has been found that the performance of the safety coating can be further improved by optimizing some physical and chemical parameters of the inorganic filler.

As a further improvement of the present invention, when the conductivity a of the inorganic filler satisfies $10^{-3}$ S/m≤σ≤$10^2$ S/m, there is an additional benefit. The inventors have found that the addition of inorganic fillers can affect the electrical conductivity of the safety coating, which in turn may affect the electrical conductivity of the entire plate. When the conductivity a of the inorganic filler satisfies $10^{-3}$ S/m≤σ≤$10^2$ S/m, the electrical conductivity of the safety coating at the normal use temperature of the battery can be improved. If the conductivity a of the inorganic filler is too small, the initial internal resistance and the growth rate of the internal resistance of the safety coating will be very high; if a is too high, the conductive network will not be cut off easily at the PTC operating temperature and thus the PTC material layer cannot works well. Within the above conductivity range, the internal resistance and its growth rate of the battery during normal use are high, and the conductive network can be quickly disconnected when an internal short circuit or a high temperature condition occurs.

Those skilled in the art can understand that if the conductivity a of some inorganic fillers does not satisfy $10^{-3}$ S/m≤σ≤$10^2$ S/m, above requirement to the conductivity can be satisfied by the material modification or modification means commonly used in the art.

As a further improvement of the present invention, an inorganic filler having a microhardness of more than 150 MPa can be used. The inventors have found through extensive experiments that when the hardness of the inorganic filler is more than 150 MPa (Vickers microhardness), it may ensure that the safety coating does not deform during the plate compaction process. Therefore, the hardness of the inorganic filler is preferably greater than 150 MPa (Vickers microhardness). When the hardness is too low, a poor plate may be obtained in the plate compaction process due to the deformation of the safety coating, in which the current collector may directly contact the electrode active material layer, and thus the PTC safety coating cannot improve the battery safety performance.

As a further improvement of the present invention, when the specific surface area (BET) of the inorganic filler is not more than 500 $m^2$/g, there are additional benefits. The inventors have found that when the specific surface area of the inorganic filler increases, the side reaction will increase and thus the battery performance will be affected. When the specific surface area of the inorganic filler is too large, a higher proportion of binder is consumed, which causes the adhesion between the safety coating and the current collector and the electrode active material layers to be reduced and the internal resistance growth rate to be higher. When the specific surface area (BET) of the inorganic filler is not more than 500 $m^2$/g, a better comprehensive effect can be provided.

For the same material, if the particle size is small, the specific surface area is large; and if the particle size is big, the specific surface area is small. Therefore, as a further improvement of the present invention, the inorganic filler has an average particle diameter D of 100 nm≤D≤10 μm, preferably 1 μm≤D≤6 μm. As described above, the inorganic filler can stabilize the safety coating by hindering the solvent (such as NMP, electrolyte, etc.) from producing adverse effects such as dissolution and swelling on the polymer material and by ensuring that the safety coating is not easily deformed. In order to exert the above effects, the particle diameter of the inorganic filler has a preferred range. The inventors have found that when the particle size of the inorganic filler is too small, the specific surface area increases, and the side reaction increases; when it is too large, the coating thickness of the safety coating layer is excessively large and the thickness is uneven. After a large number of experiments, it has been found that the average particle diameter D of the inorganic filler is suitable to be 100 nm≤D≤10 μm, preferably 1 μm≤D≤6 μm. Further, when the particle diameter of the inorganic filler is in the above range, the conductive network blocking effect of the inorganic particles at a high temperature can be improved, so that the performance such as the response speed of the safety coating may be improved.

In addition to the polymer matrix, the electrically conductive material, and the inorganic filler, the safety coating of the present invention may also contain other materials or components, such as a binder that promotes adhesion between the coating and the substrate of the current collector, and the like. Those skilled in the art can select other auxiliaries according to actual demands. For example, in other embodiments of the invention, the safety coating may also include other binders, particularly aqueous binders. The aqueous binder is selected from the group consisting of CMC, polyacrylate, polycarbonate, polyethylene oxide, rubber, polyurethane, sodium carboxymethyl cellulose, polyacrylic acid, acrylonitrile multicomponent copolymer, gelatin, chitosan, sodium alginate, a coupling agent, cyanoacrylate, a polymeric cyclic ether derivative, a hydroxy derivative of cyclodextrin, and the like.

Since the polymer matrix material used in the safety coating of the present invention itself has a good adhesion, in order to simplify the process and to save the cost, in a preferred embodiment of the present invention, the safety coating layer is substantially free of other binders other than the matrix material in which the phrase "substantially free" means ≤3%, ≤1%, or ≤0.5%.

Moreover, in some preferred embodiments of the present invention, the safety coating of the present invention may consist essentially of the polymer matrix, the electrically conductive material, and the inorganic filler, which is free of a significant amounts (e.g., ≤3%, ≤1%, or ≤0.5%) of other components.

As a further improvement of the present invention, when the safety coating of the present invention is used for a positive electrode plate, the use of a positive electrode electrochemically active material (hereinafter also referred to as "electrochemically active material") as an inorganic filler has a particular advantage.

The inventors have found that the use of electrochemically active materials as an inorganic filler has particular advantages. In this case, in addition to above mentioned function as stabilizing the safety coating i.e. hindering the electrolyte or the solvent (such as NMP, etc.) of the electrode active material layer from dissolving or swelling the polymer material of the safety coating; and ensuring that the safety coating is not easily deformed and as improving the performance such as the response speed and the like of the safety coating, the positive electrode electrochemically active material used as the inorganic filler may further play the following two roles: (1) to improve the overcharge performance of the battery. In the PTC safety coating system composed of a fluorinated polyolefin and/or chlorinated polyolefin polymer matrix and a conductive material, since the electrochemically active material has the characteristics of lithium ion intercalation, the electrochemically active material can be used as an "active site" in the conductive network at the normal operating temperature of the battery and thus the number of "active site" in the safety coating is increased. In the process of overcharging, the electrochemically active material will delithiate, the de-lithiating process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved. (2) to contribute charge and discharge capacity. Since the electrochemically active material can contribute a certain charge and discharge capacity at the normal operating temperature of the battery, the effect of the safety coating on the electrochemical performance such as capacity of the battery at the normal operating temperature can be dropped to the lowest.

A particularly preferred positive electrode electrochemically active material suitable for such use is at least one selected from the group consisting of lithium cobalt oxide, lithium nickel manganese cobalt oxide, lithium nickel manganese aluminium oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganese oxide, spinel lithium nickel manganese oxide, and lithium titanate.

In addition, the inventors have found that when the positive electrode electrochemically active material is used as a filler for improving the electrical conductivity of the filler, the performance of the entire plate is further improved for the main reasons as follows. Increase of conductivity may reduce the internal resistance of the battery and further improve the internal resistance that is increased due to the presence of the safety coating, thereby improving the electrochemical performance such as the cycle life of the battery; those skilled in the art will appreciate that the conductivity of the inorganic filler can be improved by means of material modification or modification commonly used in the art, for example, coating and modifying the inorganic filler with a conductive carbon, a conductive metal or a conductive polymer.

Therefore, in the safety coating of the present invention, either an unmodified electrochemically active material or a modified electrochemically active material with an electroconductive carbon coating, a conductive metal coating or a conductive polymer coating may be used. As a preferred embodiment of the present invention, an electrochemically active material or a material obtained by modification of such an electrochemically active material with a conductive carbon coating, a conductive metal coating or a conductive polymer coating may be used as the inorganic filler.

In some preferred embodiments, the inorganic filler in the safety coating of the present invention is preferably at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel lithium nickel manganese oxide, and lithium titanate. These electrochemically active materials are commonly used materials in the manufacture of lithium batteries, most of which are commercially available directly.

In other preferred embodiments, the inorganic filler in the safety coating of the present invention is preferably at least one of a conductive carbon coating modified electrochemically active material, such as conductive carbon coating modified lithium cobalt oxide, conductive carbon coating modified lithium nickel manganese cobalt oxide, conductive carbon coating modified lithium nickel manganese aluminium oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

Further preferably, in the carbon coating modified positive electrode electrochemically active material, the weight percentage of carbon is from 0.5 wt % to 5 wt % based on the weight of the carbon coating modified positive electrode electrochemically active material. If the content of the carbon coating is too small, the effect of improving the conductivity will not be obvious; if the content is too large, the PTC effect of the PTC safety coating will be affected to some extent.

Those skilled in the art will appreciate that various defined or preferred range for the selected component, the component content, and the physicochemical property parameters (hardness, particle size, specific surface area, conductivity, etc.) of the safety coating in above mentioned various embodiments of the present invention, may be combined arbitrarily and the combined embodiments are still within the scope of the invention and are considered as part of the disclosure.

In the present invention, the coating thickness H of the safety coating is not more than 40 µm, preferably not more than 25 µm, more preferably not more than 20 µm, 15 µm or 10 µm. The coating thickness of the safety coating is greater than or equal to 1 µm, preferably greater than or equal to 2 µm, and more preferably greater than or equal to 3 µm. If the thickness is too small, it is not enough to ensure that the safety coating improves the safety performance of the battery; if it is too large, the internal resistance of the battery will increase seriously, which will affect the electrochemical performance of the battery during normal operation.

In the electrode plate of the present invention, a safety coating is applied over the electrode current collector. For the current collector, materials commonly used in the art, such as metal flakes or metal foils such as stainless steel, aluminum, copper, titanium, etc., can be used.

In the electrode plate of the present invention, an electrode active material layer is provided outside the safety coating. For the positive electrode plate, a positive active material layer is used; and for the negative electrode plate, a negative active material layer is used.

As the positive electrode active material layer used in the present invention, various positive electrode active material layers suitable for use in a lithium battery known in the art can be selected, and the constitution and preparation method thereof are well known in the art. The positive electrode active material layer contains a positive electrode active material, and various positive electrode active materials for preparing a lithium ion secondary battery positive electrode known to those skilled in the art may be used. For example, the positive electrode active material is a lithium-containing composite metal oxide, for example one or more of $LiCoO_2$, $LiNiO_2$, $LiMn_2O_4$, $LiFePO_4$, lithium nickel cobalt manganese oxide (such as $LiNi_{0.5}Co_{0.2}Mn_{0.3}O_2$) and one or more of lithium nickel manganese oxide.

When a positive electrode electrochemically active material or a coating modified positive electrode electrochemically active material is used as an inorganic filler for a safety coating of a positive electrode plate, the positive electrode electrochemically active material in the safety coating layer and the positive electrode active material in the positive electrode active materials layer may be the same or different.

The negative electrode active material layer used in the present invention may be selected from various negative electrode active material layers suitable for use in lithium batteries known in the art, and the constitution and preparation method thereof are well known in the art. The negative electrode active material layer contains a negative electrode active material, and various negative electrode active materials for preparing a lithium ion secondary battery negative electrode known to those skilled in the art may be used, for example, a carbonaceous material such as graphite (artificial graphite or natural graphite), conductive carbon black or carbon fiber and the like, a metal or a semimetal material such as Si, Sn, Ge, Bi, Sn, or In or an alloy thereof, a lithium-containing nitride or a lithium-containing oxide, a lithium metal or a lithium aluminum alloy.

The present application also discloses an electrochemical device comprising the electrode plate according to the present invention. The electrochemical device may be a capacitor, a primary battery, or a secondary battery. For example, it may be a lithium ion capacitor, a lithium ion primary battery, or a lithium ion secondary battery. In addition to the use of the electrode plate (positive electrode plate and/or negative electrode plate) of the present invention, the construction and preparation methods of these electrochemical devices are known per se. The electrochemical device can have improved safety and electrical performances (e.g., cycle performance) due to the use of the electrode plate of the present invention. Further, since the electrode plate of the present invention is easy to manufacture, the manufacturing cost of the electrochemical device can be reduced due to use of the electrode plate of the present invention.

EXAMPLES

In order to make the objects, the technical solutions and the beneficial technical effects of the present invention more clear, the present invention will be described in further detail below with reference to the embodiments. However, it is to be understood that the embodiments of the present invention are not intended to limit the invention, and the embodiments of the invention are not limited to the embodiments set forth herein. The experimental conditions not indicated in the examples may refer to conventional conditions, or the conditions recommended by the material supplier or equipment supplier.

1. Preparation Process 1.1 Preparation of Safety Coating

A certain ratio of polymer matrix material, conductive material, and inorganic filler were evenly mixed with N-methyl-2-pyrrolidone (NMP) as a solvent and the resulting mixture was coated on a current collector, such as a positive current collector aluminum foil or a negative current collector copper foil. After drying, a PTC layer, i.e., the safety coating, was obtained.

The main materials used in the safety coating of the specific examples are as follows:

The polymer matrix material: PVDF, PVDC;

The conductive material (conductive agent): Super-P (TIMCAL, Switzerland, abbreviated as SP);

The inorganic filler: alumina, carbon coating modified alumina (abbreviated as alumina/C), lithium iron phosphate (abbreviated as LFP), carbon coating modified lithium iron phosphate (abbreviated as LFP/C), lithium titanate ($Li_4Ti_5O_{12}$), carbon coating modified lithium titanate (abbreviated as $Li_4Ti_5O_{12}$/C), lithium cobalt oxide (abbreviated as LCO), carbon coating modified lithium cobalt oxide (abbreviated as LCO/C), silicon carbide (SiC), and $Sb_2S_2O$.

The above materials are commonly used materials in the lithium battery industry and can be available commercially by the corresponding suppliers.

1.2 Preparation of Positive and Negative Electrode Plates with Safety Coating

Positive electrode plate was prepared as follows. 90 wt % ternary material NCM811 ($LiNi_{0.8}Co_{0.1}Mn_{0.1}O_2$), 5 wt % SP and 5 wt % PVDF were mixed evenly with NMP as a solvent, and then the resulting mixture was applied to the safety coating on the surface of the positive cathode current collector aluminum foil as prepared according to the above 1.1, as a positive active material layer. After drying at 85° C., the positive active material layer was cold pressed, then trimmed, cut, slit, and dried under vacuum at 85° C. for 4 hours. After welding, a positive electrode plate (i.e., a cathode plate) of a secondary battery that satisfies the requirements was obtained.

Negative electrode plate was prepared as follows. Active material graphite, conductive agent Super-P, thickener CMC, adhesive SBR were added to deionized water as solvent at a mass ratio of 96.5:1.0:1.0:1.5 to form an anode slurry. The slurry was applied to the safety coating on the surface of the negative current collector copper foil prepared according to the above 1.1, as a negative active material layer. After drying at 85° C., the negative active material layer was dried, then trimmed, cut, slit, and dried under vacuum at 110° C. for 4 hours. After welding, a negative electrode plate (i.e., an anode plate) of a secondary battery that satisfies the requirements was obtained.

1.3 Preparation of Conventional Positive Electrode Plate and Conventional Negative Electrode Plate Conventional positive electrode plate, hereinafter referred as "CPlate P", was prepared the same as the preparation method of 1.2 except that there is no safety coating on the surface of the positive electrode current collector aluminum foil.

Conventional negative electrode plate, hereinafter referred as "CPlate N", was prepared the same as the preparation method of 1.2 except that there is no safety coating on the surface of the negative electrode current collector aluminum copper foil.

1.4 Preparation of Electrolyte

The electrolyte was prepared as follows. Ethylene carbonate (EC), ethyl methyl carbonate (EMC), and diethyl carbonate (DEC) were mixed in a volume ratio of 3:5:2 to obtain an EC/EMC/DEC mixed solvent. And then, a sufficiently dried lithium salt LiPF6 was dissolved into the mixed solvent to obtain a solution having a concentration of 1 M, i.e. the electrolyte.

1.5 Preparation of Battery

A polypropylene film with 12 μm thickness was used as a separator and the positive electrode, the separator and the negative electrode were stacked in order, so that the separator was sandwiched in between the positive electrode and the negative electrode, and then the stack was wound into a bare battery core. After vacuum baking at 75° C. for 10 h, the electrolyte (prepared as described in "1.4 Preparation of Electrolyte" above) was injected therein followed by vacuum-packing, and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charge and discharge processes were repeated twice. Finally, the battery core was charged to 3.8V with a constant current of 0.1 C, thereby completing the preparation of the secondary battery.

2. Tests for Material Performances

In each of the examples and comparative examples, unless otherwise specified, the physical properties of various materials (mainly inorganic fillers) constituting the safety coating were tested by the following test methods, respectively.

2.1 Conductivity

The conductivity of the sample was tested using a RTS-4 type four probe tester, which was measured 5 times and averaged in unit of S/m.

2.2 Particle size

The power sample was dispersed in a dispersion medium (distilled water), which was measured with a Malvern laser particle size analyzer MS2000 5 times and averaged in unit of μm.

2.3 BET (Specific Surface Area)

The specific surface area of the powder sample was tested using a Quadrasorb SI specific surface tester, which was measured 5 times and averaged in unit of $m^2/g$.

2.4 Hardness

The powder sample was mixed with bakelite or an organic resin, and the mixture was made into a small compact at 100-200 MPa, and then was heated to 140° C. to cure. After grinding and polishing the compact, the micro-hardness was tested under a load of 20 to 30 g with Qness Q30 type digital micro Vickers hardness tester, which was measured 5 times and averaged in MPa.

3. Tests for Battery Performances

The safety performances of the secondary batteries of various examples and comparative examples were evaluated using GBT31485-2015 "Safety Requirements and Test Methods for Traction Battery of Electric Vehicles", and the test results were recorded.

3.1 Puncture Test:

The secondary battery was fully charged to the charge cut-off voltage with a current of 1 C, and then charged with a constant voltage until the current dropped to 0.05 C. After that, charging was terminated. A high temperature resistant steel needle of φ5-10 mm which tip has a cone angle of 45° was used to puncture the battery plate at a speed of 25 mm/s in the direction perpendicular to the battery plate. The puncture position should be close to the geometric center of the surface to be punctured, the steel needle stayed in the battery, and then observe if the battery has an indication of burning or exploding.

3.2 Overcharge Test:

The secondary battery was fully charged to the charge cut-off voltage with a current of 1 C, and then charged with a constant voltage until the current dropped to 0.05 C. After that, charging was terminated. Then, after charging with a constant current of 1 C to reach 1.5 times the charging termination voltage or after charging for 1 hour, the charging was terminated.

3.3 Cycle Performance Test:

The test conditions of the cycle number were as follows: the secondary battery was subjected to a 1 C/1 C cycle test at 25° C. in which the charge and discharge voltage range was 2.8 to 4.2 V. The test was terminated when the capacity was attenuated to 80% of the first discharge specific capacity.

3.4 PTC Effect Test

The secondary battery was fully charged to the charge cut-off voltage with a current of 1 C, and then charged with a constant voltage until the current was reduced to 0.05 C. After that, the charging was terminated and the DC resistance of the battery was tested (4 C current discharge for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

4. Test Results 4.1 Protective Effect (PTC Effect) of Safety Coating and Effect of the Safety Coating on Battery Performances In order to verify the protective effect of the present invention, the corresponding safety coating, positive electrode plate, negative electrode plate and battery were prepared with the specific materials and amounts listed in Table 1-1 below according to the methods and procedures described in "1. Preparation of safety coating", and were tested according to the method specified in "Tests for battery performances". In order to ensure accuracy of data, 4 samples were prepared for each battery (10 samples for the puncture test) and tested independently. The final test results were averaged and shown in Table 1-2 and Table 1-3.

In the test, the conventional electrode CPlate P and the conventional electrode CPlate N were prepared with the method of "1.3 Preparation of conventional positive electrode plate and conventional negative electrode plate"; the other electrode plates, hereinafter abbreviate as Plate ** were prepared with the method of "1.2 Preparation of positive electrode plate and negative electrode plate with safety coating" in which the safety coating material was specified in the following table.

TABLE 1-1

| | | | Compositions of electrode plates | | | | | |
|---|---|---|---|---|---|---|---|---|
| | | | | Composition of safety coating | | | | |
| | | | Polymer matrix | | Conductive materials | | Inorganic fillers | | Thickness |
| | electrode | Active materials | material | wt % | material | wt % | material | wt % | H (μm) |
| CPlate P | P | NCM811 | / | / | / | / | / | / | / |
| CPlate P | N | Graphite | / | / | / | / | / | / | / |
| Plate CP | P | NCM811 | PVDF | 90 | SP | 10 | / | / | 20 |
| Plate 1 | P | NCM811 | PVDC | 35 | SP | 10 | Alumina | 55 | 10 |
| Plate 2 | P | NCM811 | PVDF | 35 | SP | 10 | LFP | 55 | 3 |
| Plate 3 | N | Graphite | PVDF | 35 | SP | 10 | Alumina | 55 | 20 |

Note:
in the present invention, Plate CP refers to a plate for control.

TABLE 1-2 performances of lithium-ion batteries

| Battery No. | Positive | Negative | Puncture Test |
|---|---|---|---|
| B1 | CPlate P | CPlate N | 10 fail |
| B2 | Plate CP | CPlate N | 2 pass and 8 fail |
| B3 | Plate 1 | CPlate N | 10 pass |
| B4 | Plate 2 | CPlate N | 10 pass |
| B5 | CPlate P | Plate 3 | 10 pass |

TABLE 1-3 performances of lithium-ion batteries

| Battery No. | Positive | Negative | DC resistance growth rate@130° C., 1 h | DC resistance growth rate@130° C., 2 h |
|---|---|---|---|---|
| B2 | Plate CP | CPlate N | 20% | 30% |
| B4 | Plate 2 | CPlate N | 1200% | 1500% |
| B5 | CPlate P | Plate 3 | 1000% | 1100% |

The data of Table 1-1, Table 1-2 and Table 1-3 demonstrated that the electrode plate of the present invention could greatly improve the needle-puncture performance of the battery, and the addition of the inorganic filler could significantly improve the DC resistance growth rate of the battery at high temperature, thereby improving the pass rate of the battery needle puncture test.

4.2 Effect of Component Content in Safety Coating

In order to study the effect of component content in safety coating, the corresponding safety coating, positive electrode plate, negative electrode plate and battery were prepared with the specific materials and amounts listed in Table 2-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged and shown in Table 2-2.

TABLE 2-2 performances of lithium-ion batteries

| Battery No. | Positive | Negative | Puncture Test | Cycle Life |
|---|---|---|---|---|
| B6 | Plate CP 2-1 | CPlate N | 5 fail, 5 pass | 2502 |
| B7 | Plate 2-2 | CPlate N | 10 pass | 2351 |
| B8 | Plate 2-3 | CPlate N | 10 pass | 2205 |
| B9 | Plate 2-4 | CPlate N | 10 pass | 2251 |
| B10 | Plate 2-5 | CPlate N | 10 pass | 2000 |
| B11 | Plate 2-6 | CPlate N | 10 pass | 2408 |
| B12 | Plate 2-7 | CPlate N | 10 pass | 2707 |
| B13 | Plate 2-8 | CPlate N | 10 pass | 2355 |
| B14 | Plate 2-9 | CPlate N | 10 pass | 1800 |
| B15 | Plate CP 2-10 | CPlate N | 4 fail, 6 pass | 1715 |

The data in Table 2-1 and Table 2-2 demonstrated that: (1) if the content of inorganic filler was too low, the PTC effect of the safety coating could not be fully exerted, so the safety performance of the battery could not be fully improved; and if the content of inorganic filler was too high, the content of the polymer matrix was too low and the PTC effect of the safety coating could not be exerted effectively either. (2) The conductive material had a great influence on the internal resistance and polarization of the battery, thus affecting the cycle life of the battery. The higher the content of the conductive material, the smaller the internal resistance and polarization of the battery were, and the better the cycle life was.

After carrying out experiments, it was found that the suitable content range of each component of the safety coating was as follows: the weight percentage of the polymer matrix was from 35 wt % to 75 wt %; the weight percentage of the conductive material was 5 wt % to 25 wt %; and the weight percentage of the inorganic filler was from 10% by weight to 60% by weight.

As long as the content of each component of the safety coating was within the above range, the effect of improving the safety and electrical performances (e.g., cycle performance) of the battery could be achieved.

4.3 Effect of Inorganic Filler on Battery Performances

In order to further study the effect of the property of material of safety coating on the plate and battery performances, the corresponding safety coating, positive electrode plate, negative electrode plate and battery were prepared with the specific materials and amounts listed in Table 3-1 below according to the methods and procedures described in "1. Preparation of safety coating", and were tested according to the method specified in "Tests for battery performances". In order to ensure accuracy of data, 4 samples were prepared for each battery (10 samples for the puncture test) and tested independently. The final test results were averaged which were shown in Table 3-2.

TABLE 2-1

Compositions of electrode plate

| | Active electrode | Active materials | Composition of safety coating | | | | | | Thickness H μm |
|---|---|---|---|---|---|---|---|---|---|
| | | | Polymer matrix material | wt % | Conductive materials material | wt % | Inorganic fillers material | wt % | |
| Plate CP 2-1 | P | NCM811 | PVDF | 75 | SP | 20 | Alumina | 5 | 8 |
| Plate 2-2 | P | NCM811 | PVDF | 75 | SP | 15 | Alumina | 10 | 8 |
| Plate 2-3 | P | NCM811 | PVDF | 75 | SP | 10 | Alumina | 15 | 8 |
| Plate 2-4 | P | NCM811 | PVDF | 60 | SP | 10 | Alumina | 30 | 8 |
| Plate 2-5 | P | NCM811 | PVDF | 60 | SP | 8 | Alumina | 32 | 8 |
| Plate 2-6 | P | NCM811 | PVDF | 55 | SP | 15 | Alumina | 30 | 8 |
| Plate 2-7 | P | NCM811 | PVDF | 50 | SP | 25 | Alumina | 25 | 8 |
| Plate 2-8 | P | NCM811 | PVDF | 40 | SP | 15 | Alumina | 45 | 8 |
| Plate 2-9 | P | NCM811 | PVDF | 35 | SP | 5 | Alumina | 60 | 8 |
| Plate CP 2-10 | P | NCM811 | PVDF | 25 | SP | 5 | Alumina | 70 | 8 |

TABLE 3-1

Compositions of electrode plate and material's property

| | | Composition of safety coating and material's property | | | | | | |
|---|---|---|---|---|---|---|---|---|
| | Active | Polymer matrix | | Conductive materials | | Inorganic fillers | | Thickness |
| electrode | materials | material | wt % | material | wt % | material | wt % | conductivity (S/m) | H (μm) |
| Plate 2-11 P | NCM811 | PVDF | 60 | SP | 10 | LFP | 30 | $10^{-6}$ | 8 |
| Plate 2-12 P | NCM811 | PVDF | 60 | SP | 10 | LFP/C | 30 | $10^{-3}$ | 8 |
| Plate 2-13 P | NCM811 | PVDF | 60 | SP | 10 | LCO | 30 | 0.5 | 8 |
| Plate 2-14 P | NCM811 | PVDF | 60 | SP | 10 | $Li_4Ti_5O_{12}$/C | 30 | 8 | 8 |
| Plate 2-15 P | NCM811 | PVDF | 60 | SP | 10 | LCO/C | 30 | 50 | 8 |
| Plate 2-16 P | NCM811 | PVDF | 60 | SP | 10 | LCO/C | 30 | 100 | 8 |

TABLE 3-2 performances of lithium ion batteries

| Battery No. | Positive | Negative | Puncture Test | Cycle Life |
|---|---|---|---|---|
| B16 | Plate 2-11 | CPlate N | 10 pass | 2109 |
| B17 | Plate 2-12 | CPlate N | 10 pass | 2204 |
| B18 | Plate 2-13 | CPlate N | 10 pass | 2251 |
| B19 | Plate 2-14 | CPlate N | 10 pass | 2294 |

TABLE 3-2-continued performances of lithium ion batteries

| Battery No. | Positive | Negative | Puncture Test | Cycle Life |
|---|---|---|---|---|
| B20 | Plate 2-15 | CPlate N | 10 pass | 2316 |
| B21 | Plate 2-16 | CPlate N | 10 pass | 2407 |

The data in Table 3-1 and Table 3-2 demonstrated that the conductivity of the inorganic filler had a certain influence on the internal resistance of the plate and the battery. The higher the conductivity, the smaller the internal resistance and polarization were, and the better the cycle performance of the battery was. It was further found that when the conductivity a satisfied the relationship of $10^{-3}$ S/m≤σ≤$10^2$ S/m, the battery safety and electrical performances both were very good, and the overall performance of the battery was optimal.

4.4 Effect of Particle Size of Inorganic Fillers on Battery Performances

In order to further study the effect of the property of material of safety coating on the plate and battery performance, the corresponding safety coating, positive electrode plate, negative electrode plate and battery were prepared with the specific materials and amounts listed in Table 4-1 below according to the methods and procedures described in "1. Preparation of safety coating", and were tested according to the method specified in "Tests for battery performances". In order to ensure accuracy of data, 4 samples were prepared for each battery (10 samples for the puncture test) and tested independently. The final test results were averaged, which were shown in Table 4-2.

TABLE 4-1

Compositions of electrode plate and material's property

| | | Composition of safety coating and material's property | | | | | | |
|---|---|---|---|---|---|---|---|---|
| | Active | Polymer matrix | | Conductive materials | | Inorganic fillers | | Thickness |
| electrode | materials | material | wt % | material | wt % | material | wt % | Average diameter D | H (μm) |
| Plate 2-17 P | NCM811 | PVDF | 60 | SP | 10 | alumina | 30 | 100 nm | 8 |
| Plate 2-18 P | NCM811 | PVDF | 60 | SP | 10 | alumina | 30 | 1 μm | 8 |
| Plate 2-19 P | NCM811 | PVDF | 60 | SP | 10 | alumina | 30 | 3 μm | 8 |
| Plate 2-20 P | NCM811 | PVDF | 60 | SP | 10 | alumina | 30 | 6 μm | 8 |
| Plate 2-21 P | NCM811 | PVDF | 60 | SP | 10 | alumina | 30 | 8 μm | 8 |
| Plate 2-22 P | NCM811 | PVDF | 60 | SP | 10 | alumina | 30 | 10 μm | 8 |

TABLE 4-2 performance result of lithium ion battery

| Battery No. | Positive | Negative | Puncture Test | DC resistance growth rate@ 130 C., 1 h |
|---|---|---|---|---|
| B22 | Plate 2-17 | CPlate N | 10 pass | 300% |
| B23 | Plate 2-18 | CPlate N | 10 pass | 800% |
| B24 | Plate 2-19 | CPlate N | 10 pass | 1000% |
| B25 | Plate 2-20 | CPlate N | 10 pass | 1200% |
| B26 | Plate 2-21 | CPlate N | 10 pass | 1150% |
| B27 | Plate 2-22 | CPlate N | 10 pass | 1180% |

The data in Table 4-1 and Table 4-2 demonstrated that the particle size of the inorganic filler had an effect on the PTC response speed of the safety coating. The larger the particle size, the greater the PTC response speed was. In above tested range of 100 nm≤D≤10 μm, the battery exhibited a good PTC effect, and the electrical performance such as cycle performance also was improved.

4.5 Effect of Specific Surface Area of Inorganic Fillers on Battery Performances In order to further study the effect of the property of material of safety coating on the plate and battery performances, the corresponding safety coating, positive electrode plate, negative electrode plate and battery were prepared with the specific materials and amounts listed in Table 5-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged, which were shown in Table 5-2.

The data in Tables 5-1 and 5-2 demonstrate that in the case that the specific surface area of the inorganic filler was reduced, the side reaction was less and the electrochemical performances of the battery were better. The specific surface area of the inorganic filler was preferably ≤500 m²/g.

4.6 Effect of Hardness of Inorganic Fillers on Battery Performances

In order to further study the effect of the property of material of safety coating on the plate and battery performances, the corresponding safety coating, positive electrode plate, negative electrode plate and battery were prepared with the specific materials and amounts listed in Table 6-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged, which were shown in Table 6-2.

TABLE 5-1

Compositions of electrode plate and material's property

| | | Composition of safety coating and material's property | | | | | | | |
|---|---|---|---|---|---|---|---|---|---|
| | Active | Polymer matrix | | Conductive materials | | Inorganic fillers | | BET | Thickness |
| electrode | materials | material | wt % | material | wt % | material | wt % | $(m^2/g)$ | H (μm) |
| Plate 2-23 P | NCM811 | PVDF | 60 | SP | 10 | Alumina/C | 30 | 1000 | 8 |
| Plate 2-24 P | NCM811 | PVDF | 60 | SP | 10 | Alumina/C | 30 | 450 | 8 |
| Plate 2-25 P | NCM811 | PVDF | 60 | SP | 10 | Alumina/C | 30 | 300 | 8 |
| Plate 2-26 P | NCM811 | PVDF | 60 | SP | 10 | Alumina/C | 30 | 260 | 8 |
| Plate 2-27 P | NCM811 | PVDF | 60 | SP | 10 | Alumina/C | 30 | 170 | 8 |
| Plate 2-28 P | NCM811 | PVDF | 60 | SP | 10 | Alumina/C | 30 | 80 | 8 |

TABLE 5-2 performances of lithium ion batteries

| Battery No. | Positive | Negative | Puncture Test | Cycle Life (cycles) |
|---|---|---|---|---|
| B28 | Plate 2-23 | CPlate N | 10 pass | 1028 |
| B29 | Plate 2-24 | CPlate N | 10 pass | 2000 |
| B30 | Plate 2-25 | CPlate N | 10 pass | 2080 |

TABLE 5-2-continued performances of lithium ion batteries

| Battery No. | Positive | Negative | Puncture Test | Cycle Life (cycles) |
|---|---|---|---|---|
| B31 | Plate 2-26 | CPlate N | 10 pass | 2150 |
| B32 | Plate 2-27 | CPlate N | 10 pass | 2210 |
| B33 | Plate 2-28 | CPlate N | 10 pass | 2306 |

TABLE 6-1

Compositions of electrode plate and material's property

| | | Composition of safety coating and material's property | | | | | | | |
|---|---|---|---|---|---|---|---|---|---|
| | Active | Polymer matrix | | Conductive materials | | Inorganic fillers | | hardness | Thickness |
| electrode | materials | material | wt % | material | wt % | material | wt % | (MPa) | H (μm) |
| Plate 2-29 P | NCM811 | PVDF | 60 | SP | 10 | $Sb_2S_2O$ | 30 | 45 | 8 |
| Plate 2-30 P | NCM811 | PVDF | 60 | SP | 10 | $Li_4Ti_5O_{12}$/C | 30 | 300 | 8 |
| Plate 2-31 P | NCM811 | PVDF | 60 | SP | 10 | LFP/C | 30 | 640 | 8 |
| Plate 2-32 P | NCM811 | PVDF | 60 | SP | 10 | LCO | 30 | 800 | 8 |
| Plate 2-33 P | NCM811 | PVDF | 60 | SP | 10 | Alumina | 30 | 1200 | 8 |
| Plate 2-34 P | NCM811 | PVDF | 60 | SP | 10 | SiC | 30 | 1500 | 8 |

TABLE 6-2 performance of lithium-ion battery

| Battery No. | Positive | Negative | Puncture Test |
|---|---|---|---|
| B34 | Plate 2-29 | CPlate N | 6 fail, 4 pass |
| B35 | Plate 2-30 | CPlate N | 10 pass |
| B36 | Plate 2-31 | CPlate N | 10 pass |

TABLE 6-2-continued performance of lithium-ion battery

| Battery No. | Positive | Negative | Puncture Test |
|---|---|---|---|
| B37 | Plate 2-32 | CPlate N | 10 pass |
| B38 | Plate 2-33 | CPlate N | 10 pass |
| B39 | Plate 2-34 | CPlate N | 10 pass |

The data in Table 6-1 and Table 6-2 demonstrated that the inorganic filler with high hardness could be more beneficial to ensure that the safety coating did not deform during the pole piece compaction process. Therefore, the PTC safety coating could be more effective to improve the safety of the battery. The hardness of the filler was preferably greater than 150 MPa. The hardness within this range maximized the performance of the safety coating of the present invention for optimizing overall battery performance.

4.7 Effect of Kind of Inorganic Fillers on Battery Performances

In order to further study the effect of the property of material of safety coating on the plate and battery performances, the corresponding safety coating, positive electrode plate, negative electrode plate and battery were prepared with the specific materials and amounts listed in Table 7-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged, which is shown in Table 7-2.

TABLE 7-2 performances of lithium-ion batteries

| Battery No. | Positive | Negative | Puncture Test | Overcharge |
|---|---|---|---|---|
| B40 | Plate 2-35 | CPlate N | 10 pass | 10 fail |
| B41 | Plate 2-36 | CPlate N | 10 pass | 10 pass |
| B42 | Plate 2-37 | CPlate N | 10 pass | 10 pass |
| B43 | Plate 2-38 | CPlate N | 10 pass | 10 pass |
| B44 | Plate 2-39 | CPlate N | 10 pass | 10 pass |
| B45 | Plate 2-40 | CPlate N | 10 pass | 10 pass |

The data in Tables 7-1 and 7-2 demonstrated that electrochemically active materials could significantly improve the overcharge safety of the battery relative to other materials such as alumina.

4.8 Effect of Kind of Inorganic Fillers on Battery Performances

In order to further study the effect of the selected material on the plate and battery performances, the corresponding safety coating, positive electrode plate, negative electrode plate and battery were prepared with the specific materials and amounts listed in Table 8-1 below according to the methods and procedures described in "1. Preparation of safety coating", and were tested according to the method specified in "3. Tests for battery performances". In order to ensure accuracy of data, 4 samples were prepared for each battery (10 samples for the puncture test) and tested independently. The final test results were averaged, which were shown in Table 8-2.

TABLE 7-1

Compositions of electrode plate

| | Active electrode | Active materials | Composition of safety coating | | | | | | Thickness |
|---|---|---|---|---|---|---|---|---|---|
| | | | Polymer matrix | | Conductive materials | | Inorganic fillers | | |
| | | | material | wt % | material | wt % | material | wt % | H μm |
| Plate 2-35 | P | NCM811 | PVDF | 60 | SP | 10 | Alumina | 30 | 8 |
| Plate 2-36 | P | NCM811 | PVDF | 60 | SP | 10 | LCO | 30 | 8 |
| Plate 2-37 | P | NCM811 | PVDF | 60 | SP | 10 | LFP | 30 | 8 |
| Plate 2-38 | P | NCM811 | PVDF | 60 | SP | 10 | LFP/C | 30 | 8 |
| Plate 2-39 | P | NCM811 | PVDF | 60 | SP | 10 | $Li_4Ti_5O_{12}$ | 30 | 8 |
| Plate 2-40 | P | NCM811 | PVDF | 60 | SP | 10 | $Li_4Ti_5O_{12}$/C | 30 | 8 |

TABLE 8-1

Compositions of electrode plate

| | active electrode | Active materials | Polymer matrix material | wt % | Conductive materials material | wt % | Inorganic fillers material | wt % | Carbon content (wt %) | Thickness H (μm) |
|---|---|---|---|---|---|---|---|---|---|---|
| Plate 2-41 | P | NCM811 | PVDF | 60 | SP | 10 | Alumina | 30 | / | 8 |
| Plate 2-42 | P | NCM811 | PVDF | 60 | SP | 10 | LFP | 30 | / | 8 |
| Plate 2-43 | P | NCM811 | PVDF | 60 | SP | 10 | LFP/C | 30 | 1 | 8 |
| Plate 2-44 | P | NCM811 | PVDF | 60 | SP | 10 | LFP/C | 30 | 2 | 8 |
| Plate 2-45 | P | NCM811 | PVDF | 60 | SP | 10 | LFP/C | 30 | 3 | 8 |
| Plate 2-46 | P | NCM811 | PVDF | 60 | SP | 10 | $Li_4Ti_5O_{12}$/C | 30 | 5 | 8 |

TABLE 8-2 performances of lithium-ion batteries

| Battery No. | Positive | Negative | Puncture Test | overcharge | Cycle Test (cycles) |
|---|---|---|---|---|---|
| B46 | Plate 2-41 | CPlate N | 10 pass | 10 fail | 2200 |
| B47 | Plate 2-42 | CPlate N | 10 pass | 10 pass | 2300 |
| B48 | Plate 2-43 | CPlate N | 10 pass | 10 pass | 2500 |
| B49 | Plate 2-44 | CPlate N | 10 pass | 10 pass | 2700 |
| B50 | Plate 2-45 | CPlate N | 10 pass | 10 pass | 2900 |
| B51 | Plate 2-46 | CPlate N | 10 pass | 10 pass | 3000 |

The data in Tables 8-1 and 8-2 demonstrated that electrochemically active materials could significantly improve the overcharge safety performance of batteries compared to other materials (such as alumina). In addition, carbon coating modified electrochemically active materials could also improve the cycle life of batteries.

It will be understood by those skilled in the art that the above application examples of the safety coating of the present invention are only exemplified to be used for a lithium battery, but the safety coating of the present invention can also be applied to other types of batteries or electrochemical devices, and still may produce good technical effect of the present invention. It will be understood by those skilled in the art that in a battery or an electrochemical device, the safety coating of the present invention can be used for a positive electrode plate, a negative electrode plate, or both a positive electrode plate and a negative electrode plate, both of which can function as an effective protective effect.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. An electrode plate comprising a current collector, an electrode active material layer and a safety coating disposed between the current collector and the electrode active material layer, the safety coating comprising a polymer matrix, a conductive material and an inorganic filler in which the polymer matrix is a fluorinated polyolefin and/or chlorinated polyolefin polymer matrix, wherein based on the total weight of the safety coating, the weight percentage of the polymer matrix is from 35 wt % to 75 wt %; the weight percentage of the conductive material is from 5 wt % to 25 wt %; and the weight percentage of the inorganic filler is from 15 wt % to 45 wt %, and
wherein the inorganic filler has a conductivity a that satisfies $10^{-3}$ S/m≤σ≤$10^2$ S/m, and
wherein the inorganic filler has a microhardness of more than 150 MPa, and
wherein the inorganic filler is selected from at least one of conductive carbon coating modified lithium cobalt oxide, conductive carbon coating modified lithium nickel manganese cobalt oxide, conductive carbon coating modified lithium iron phosphate, conductive carbon coating modified lithium cobalt phosphate, conductive carbon coating modified spinel lithium manganese oxide, conductive carbon coating modified lithium titanate.

2. The electrode plate as claimed in claim 1, wherein the polymer matrix is selected from at least one of polyvinylidene fluoride (PVDF), carboxylic acid modified PVDF, acrylic acid modified PVDF, PVDF copolymer, polyvinylidene chloride (PVDC), carboxylic acid modified PVDC, acrylic acid modified PVDC and PVDC copolymer.

3. The electrode plate as claimed in claim 1, wherein the conductive material is selected from at least one of a conductive carbon-based material, a conductive metal material, and a conductive polymer material,
wherein the conductive carbon-based material is selected from at least one of conductive carbon black, acetylene black, graphite, graphene, carbon nanotubes, carbon nanofibers;
the conductive metal material is selected from at least one of Al powder, Ni powder, and gold powder; and
the conductive polymer material is selected from at least one of conductive polythiophene, conductive polypyrrole, and conductive polyaniline.

4. The electrode plate as claimed in claim 1, wherein the inorganic filler has a specific surface area (BET) of no more than 500 m²/g.

5. The electrode plate as claimed in claim 1, wherein the inorganic filler has an average particle diameter D of 100 nm≤D≤10 μm.

6. The electrode plate as claimed in claim 1, wherein the safety coating has a thickness H of 1 μm≤H≤20 μm.

7. The electrode plate as claimed in claim 1, wherein the weight percentage of the polymer matrix is from 50 wt % to 75 wt %; the weight percentage of the conductive material is from 5 wt % to 15 wt %; and the weight percentage of the inorganic filler is from 15 wt % to 45 wt %.

8. The electrode plate as claimed in claim 1, wherein the safety coating consists essentially of the polymer matrix, the electrically conductive material, and the inorganic filler.

9. The electrode plate as claimed in claim 1, which is a positive electrode plate.

10. An electrochemical device comprising a positive electrode plate and a negative electrode plate wherein the positive electrode plate and/or the negative electrode plate is the electrode plate as claimed in claim 1, and the electrochemical device is a capacitor, a primary battery or a secondary battery.

11. A safety coating for an electrode plate, comprising: a polymer matrix, a conductive material and an inorganic filler, wherein the polymer matrix is a fluorinated polyolefin and/or chlorinated polyolefin polymer matrix, and wherein based on the total weight of the safety coating, the weight percentage of the polymer matrix is from 35 wt % to 75 wt %; the weight percentage of the conductive material is from 5 wt % to 25 wt %; and the weight percentage of the inorganic filler is from 15 wt % to 45 wt %, and wherein the inorganic filler has a conductivity $\sigma$ that satisfies $10^{-3}$ S/m$\leq\sigma\leq10^{2}$ S/m; and wherein the inorganic filler has a microhardness of more than 150 MPa; and wherein the inorganic filler is selected from at least one of conductive carbon coating modified lithium cobalt oxide, conductive carbon coating modified lithium nickel manganese cobalt oxide, conductive carbon coating modified lithium iron phosphate, conductive carbon coating modified lithium cobalt phosphate, conductive carbon coating modified spinel lithium manganese oxide, conductive carbon coating modified lithium titanate.

* * * * *